United States Patent [19]
Gallo

[11] 4,075,887
[45] Feb. 28, 1978

[54] MASS AND FORCE METER

[75] Inventor: Mario Gallo, Zurich, Switzerland

[73] Assignee: Wirth, Gallo and Company, Switzerland

[21] Appl. No.: 643,326

[22] Filed: Dec. 22, 1975

[30] Foreign Application Priority Data

Jan. 23, 1975 Switzerland ............ 00967/75

[51] Int. Cl.² ............................................. G01L 1/10
[52] U.S. Cl. ............................ 73/141 R; 73/DIG. 1; 177/210 FP
[58] Field of Search .......... 73/141 R, 141 A, DIG. 1, 73/517 AV; 177/210 R, 210 FP

[56] References Cited
U.S. PATENT DOCUMENTS 3,897,681 8/1975 Meier ............................ 73/DIG. 1
4,010,638 3/1977 Gallo ............................ 73/141 R Primary Examiner—Anthony V. Ciarlante
Attorney, Agent, or Firm—Stevens, Davis, Miller & Mosher

[57] ABSTRACT

A force and mass meter using two transversally vibrating preloaded strings as the force sensitive members. The two strings are placed in a transverse magnetic field and are caused to vibrate by means of an exciting current flowing across them which is delivered by one exciter each. The exciters consist of a metering bridge, and an operational amplifier deriving the exciting current from the error signal measured across the bridge. Mutual interference of the two exciters is drastically reduced, when the point of common potential of the two exciters is connected with at least one conductor to each of the exciters.

3 Claims, 8 Drawing Figures

MASS AND FORCE METER

The present invention relates to a mass and force meter with a computing and display device, wherein the load to be measured, that is a mass or a force, acts indirectly on the tension of two pre-loaded, electrically conductive vibrating strings, one end of which is fixed, electrically insulated, to the frame of the meter, and the other end of which is electrically connected with a force-distributor, so that the frequency variations caused by the variations of the tension of the strings are used for computing and display of the value of the mass or force to be measured. The force-distributor is connected with a first transmission organ for the transmission of a pre-loading force, and with a second transmission organ for the transmission of a force proportional to the mass or force to be measured. Measuring devices of this type have been described, for instance, in U.S. Pat. Nos. 3,423,999 and 3,621,713.

In all such known meters, the two strings are excited to vibrations by electric or electromagnetic means. There exist some meters with ferromagnetic strings, excited by electromagnets, and whose vibrations are picked up by microphones, but in most cases non-magnetic, electrically conductive or made conductive materials are used. Each strng is then an arm of a Wheatstone bridge, which in a static condition, is in electric equilibrium. To excite the vibrations, a current is sent through the strings, passing over a part of their length through one or several alternating magnetic fields. The strings are then subjected to a deviating force, which, due to the magnetic flux transitions, induces an electromotive force (EMF). This EMF causes an asymmetry of the Wheatstone bridge, from which, by means of adequate circuits, the exciting current flowing through the strings is derived.

The use of this method implies that at least one end of each string is fixed, electrically insulated, to the frame of the meter, which is technically easy. The force distributor is electrically connected with the frame of the meter, the electric potential of this frame acting at the same time as a device ground.

This construction is satisfying as long as the required precision of the meter does not exceed certain limits. Disturbing signals reaching one and/or the other string in an ohmic, inductive or capacitive way limit the precision and the reproducibility of the measurements. The bigger the parts of the frame, through which the current passes, the greater this limitation. Especially the use of common current paths by both exciters can cause an inductive disturbance.

It is an object of the present invention to provide for high-resolution meters a mechanical-electrical configuration of the force distributor and of the organs surrounding it, which minimizes the length of the common paths for the currents flowing through both strings and which thereby reduces the coupling of disturbing signals and the inductive disturbance to an extent acceptable within the precision desired, without introducing in the meter undesirable additional mechanical forces.

Another object of the invention is to provide a mass and force meter comprising a frame, a digital evaluation and display device, two pre-tensioned electrically conductive strings, each having one end thereof fixed electrically insulated to said frame, a force distributor, the other end of said strings being connected galvanically to said force distributor, an exciter comprising electrical circuits for each string controlling an alternative current, two electric conductors in said circuits being electrically connected to said force distributor, a magnetic field extending over a part of the length of said strings, said alternative current exciting said strings to transversal vibrations, first and second transmission elements for transmitting to said strings a pre-tensioning force and a force, proportional to the mass or force to be measured, respectively, and electrically insulating element at each end of said transmission elements, said insulating elements being connected to said force distributor, which is thereby electrically insulated from said frame, the other ends of said transmission elements being operatively connected to receive their respective forces, means for applying to the evaluation and display device resultant frequency variations caused by the variations of tension of said strings due to the application of the force proportional to the mass or force to be measured.

In the accompanying drawings embodiments of the object of the invention are shown schematically:

Figure 1:
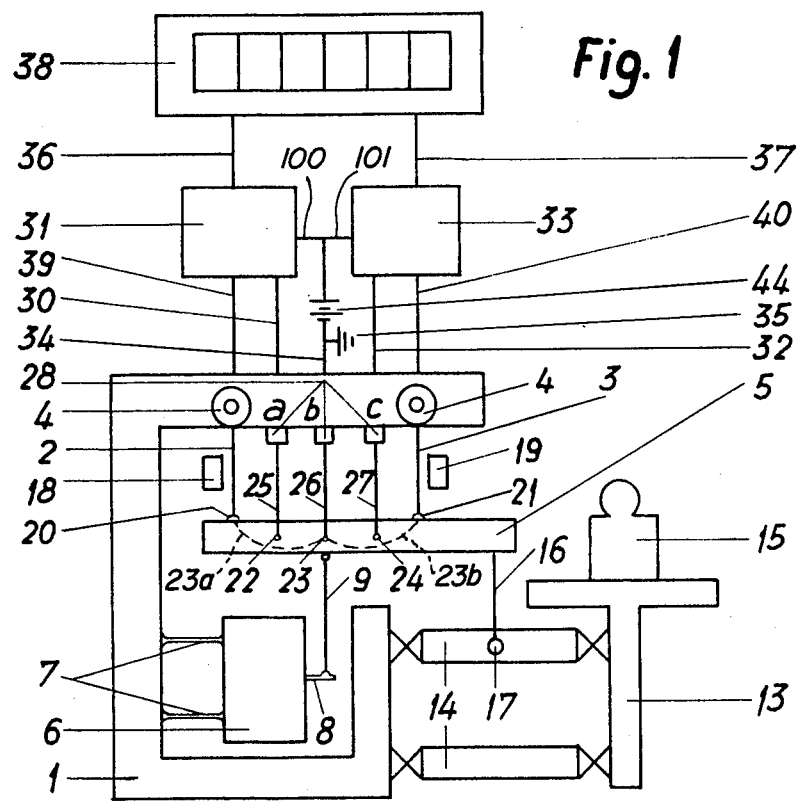
FIG. 1 is a first embodiment.

In the embodiment of FIG. 1 a mass meter is represented. It presents a frame 1 on which two vibrating strings 2, 3 are fixed by means of fastening heads 4. The ends of these strings 2, 3 are electrically connected to a beam-shaped force distributor 5. On frame 1 a preloading mass 6 is vertically and parallelly guided by guides 7. Fixed to it is a pin 8 made of electrically insulating material, e.g. of a synthetic stone, by means of which and of a rod 9, it is connected to the force distributor 5. The upper end of rod 9 is positioned half way between the end of strings 2, 3 so that they are evenly loaded by the weight of the pre-loading mass 6.

Each fastening head 4 consists of a shaft 10, two nuts 11 and two centering sleeves 12 made of electrically insulating material.

On frame 1 a load support 13 is guided vertically and parallelly by guides 14. It carries the mass 15 to be measured. The upper guide 14 is connected to the force distributor 5 by the rod 16 fixed to this upper guide 14 by means of a pin 17 made of electrically insulating material. The force transmitted by rod 16 to the force distributor 5 is proportional to the weight of mass 15 to be measured. As rod 16 is fixed to the end of the force distributor 5 this force is unevenly distributed on strings 2, 3. Beside each string 2, 3 a magnet 18, 19 is provided.

Figure 2:
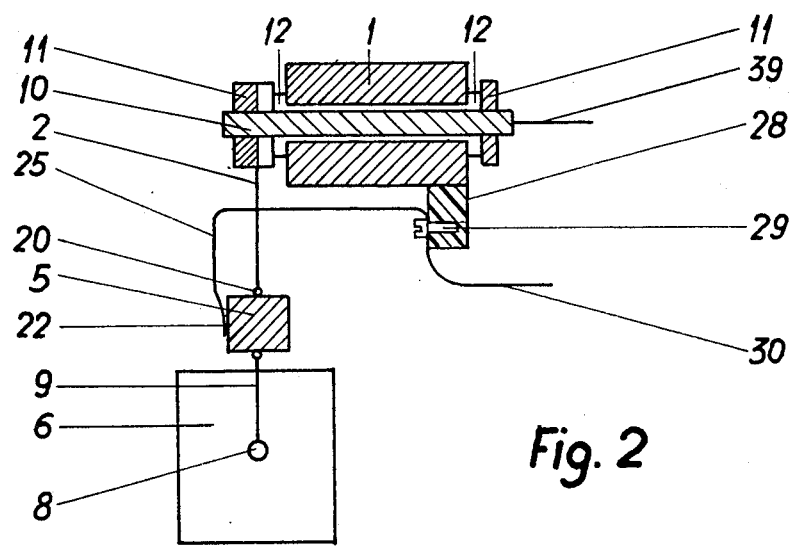
FIG. 2 is, at enlarged scale, a cross-section of a fastening head.

Between the fixation points 20, 21 of the strings 2, 3 on the force distributor 5, three fastening points 22, 23, 24 are provided, to each of which an electric conductor 25, 26, 27 is conductively fixed. Eac of these conductors 25, 26, 27 is connected to one of the insulators 28a, 28b, 28c fixed to the frame 1. As shown in FIG. 2 for conductor 25, each conductor extends from its fastening point 22 (or 23 or 24) upwards and parallelly to the strings 2, 3 then horizontally toward the insulator 28 to which it is fixed by means of a screw 29.

Conductor 25 is connected to an exciter 31 by means of a wire 30 connected to the same insulator 28. In the same way conductor 27 is electrically connected to an exciter 33 by means of a wire 32 and conductor 26 is electrically connected to an earth terminal 35 for the two exciters 31, 33 by means of a wire 34. This earth terminal 35 corresponds substantially to the electric potential of the frame 1.

Conductors 25-27 preferrably consist of a thin, flat metal ribbon with a very little longitudinal elasticity which, because of the very small elongation of the strings 2, 3 exerts an insignificantly small force. When there is some tension within fastening points 22, 23, 24 only a very small but approximately constant force is exerted on the force distributor 5, in addition to the pre-loading force. Because of the symmetrical disposition of points 22, 23, 24 relatively to points 20, 21 this small additional force is evenly distributed on strings 2, 3.

By means of leads 36, 37 exciters 31, 33 are connected to a computing and display device 38 with digital display. Such devices are well known and therefore not described here. Furthermore, exciter 31 is connected to string 2 by means of a lead 39 and exciter 33 is connected to string 3 by means of a lead 40.

The exciting current for the string 2, 3 flows through the leads 39, 40, through the string 2, 3 i.e. along the dotted paths 23a, 23b and through wire 34 serving as a return wire for both exciting currents.

The control currents, whose function will be explained referring to FIG. 3, flow through the following circuits. The control current of the exciter 31 follows conductor 30 to the insulator 28a, then conductor 25 to fixation point 22, it then flows through force distributor 5 to fixation point 23 and from there, through conductor 26 to the insulator 28b, and then through conductor 34 in a battery 44 and back to exciter 31. The control current of exciter 33 flows through conductor 32 to the insulator 28c, then through conductor 27 to fixation point 24, it then follows force distributor 5 to fixation point 23 and returns through conductor 26 up to insulator 28b and then, through conductor 34 and battery 44 to exciter 33.

Figure 3:
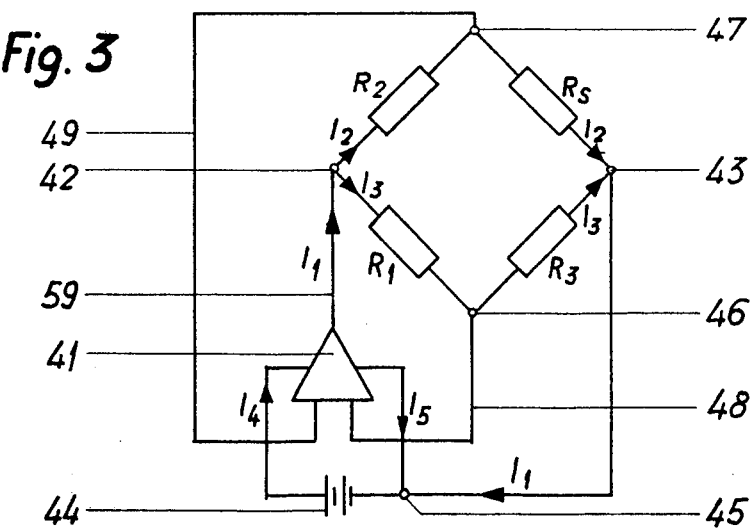
FIG. 3 is a block diagram of a first exciter.

FIG. 3 shows the block diagram of a first bridge connection corresponding to each of the exciters 31, 33. Four resistances $R_1$, $R_2$, $R_3$, $R_s$ are connected as a bridge. $R_s$ is the longitudinal resistance of one of the strings 2, 3. In static condition of the bridge the following is valid:

$$R_1/R_3 = R_2/R_s$$

An amplifier 41 supplies a current $I_1$ at an output 59, which, at a node 42, is divided into two currents $I_2$ and $I_3$, which rejoin again at a further node 43. From a current source schematically represented as battery 44, a current $I_4$ flows into the amplifier 41, where it is divided into the already mentioned current $I_1$ and in another, comparatively small control current $I_5$, which serves as the current supply for the elements of the amplifier 41. This current $I_5$ rejoins the return current $I_1$ at a point 45, and returns with it to battery 44. The potentials of two points 46, 47 are brought to amplifier 41 by two leads 48, 49. When the bridge is in equilibrium, because of the ratios of the resistances $R_1$, $R_2$, $R_3$, $R_s$ there is no difference in the potential of the two points 46 and 47; the current $I_1$ and with it the currents $I_2$ and $I_3$ disappear, because the current $I_1$ is proportional to the mentioned difference of the potentials.

Referring to FIGS. 1 and 3, node 43 of FIG. 3 corresponds to fastening points 22-24 of FIG. 1. Accordingly, since resistance $R_s$ is the longitudinal resistance of string 2, the lead connecting resistance $R_s$ to point 47 of FIG. 3 corresponds to lead 39 of FIG. 1. Similarly, insulator 28a of FIG. 1 is located intermediate resistance $R_3$ in exciter 31 and node 43 of FIG. 3 and is connected to resistance $R_3$ by lead 30 and to node 43 by lead 25 of FIG. 1. Further, node 43 is connected to the negative terminal of battery 44 by lead 26 of FIG. 1.

The dynamic behaviour of the circuit is now described for string 3. It is also valid for string 2. When a small current $I_1$ is caused by an occasional asymmetry of the bridge, string 3, represented in FIG. 3 by the resistance $R_s$, is being moved within the field of the magnet 19. Because string 3 moves perpendicularly to the magnetic field lines of magnet 19, the magnetic flux in the bridge varies proportionally to the speed of string 3. Therefore an EMF is induced in string 3, which is proportional to the variation of the flux and consequently proportional to the speed of string 3. Since this EMF appears only in the arm of the bridge by string 3, at points 46, 47 a potential drop appears, and is transmitted to amplifier 41 through leads 48, 49. From this potential drop the amplifier 41 forms the current $I_1$ by linear amplification. This current reaches its highest value when string 3 crosses the zero position, because its speed is then at its peak. After having reached the extreme position—where, because of the absence of speed there is no current $I_1$—string 3 is pushed mechanically into the other extreme position, passing again through the zero position. Now another driving phase by current $I_1$ starts. The frequency with which the intensity of current $I_1$ is changing is determined by the mechanical properties of the string, like length, tension, mass per unity of length. According to the configuration of the magnetic field the fundamental oscillation or one of the harmonics of the string can be excited. In order to keep the amplitude of the string small, amplifier 41 contains a limiting circuit (not represented), which prevents current $I_1$ from exceeding a given value.

Figure 8:
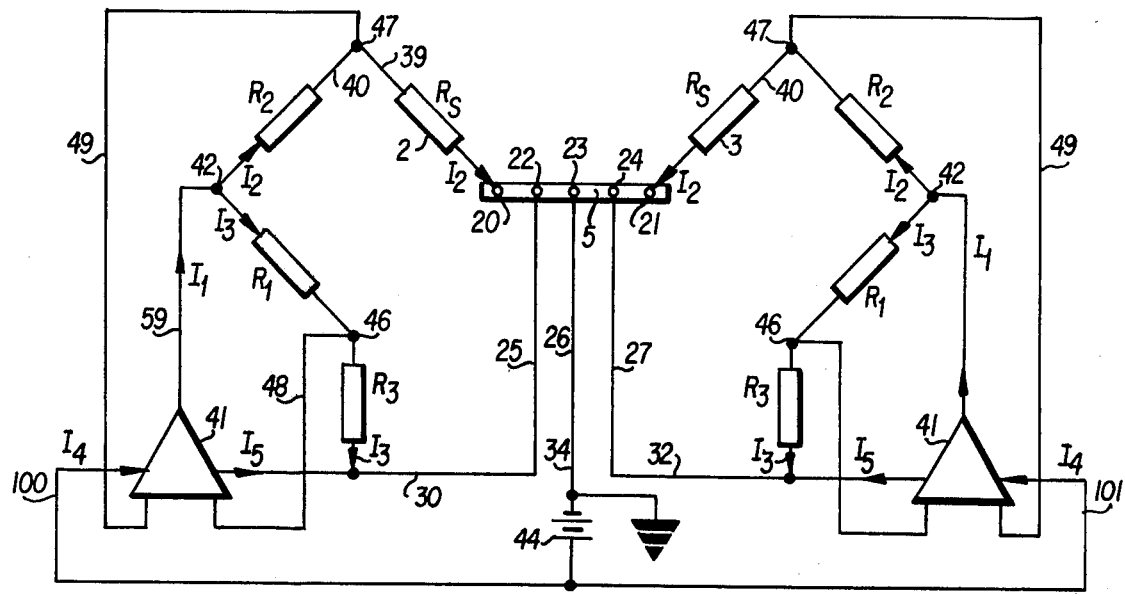
FIG. 8 illustrates the incorporation of two FIG. 3 exciter circuits into the circuit of FIG. 1.

As is readily apparent from FIGS. 1 and 3 and their accompanying description, two FIG. 3 exciter circuits, each having control (30, 32) and exciter (39, 40) current outputs, current inputs (100, 101), and a shared common return path 26 are employed in FIG. 1. FIG. 8 illustrates the common sharing of the return path by two FIG. 3 exciter circuits in greater detail. The current $I_4$ is supplied by leads 100, 101 to respective exciters 31, 33 from the shared battery 44, as illustrated in FIGS. 3 and 8. The exciter outputs (39, 40) energizing strings 2, 3 ($R_s$ in FIG. 3) supply a current $I_2$ to the string which returns to the battery by shared conductor 26. As shown in FIG. 3, since $I_4 = I_1 + I_5 = I_2 + I_3 + I_5$, the current returned to battery 44 via conductor 26 for each exciter equals $I_2 + I_3 + I_5$. This requires that currents $I_5$ and $I_3$ be jointly supplied to conductor 26 via leads 25 from exciter 31(33), as illustrated in FIG. 8.

Figure 4:
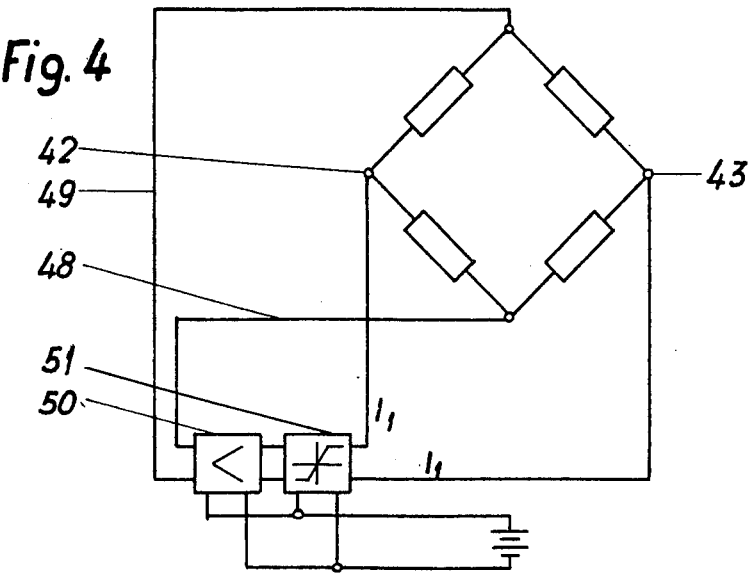
FIG. 4 is a block diagram of a second exciter.

FIG. 4 shows the block diagram of another embodiment of the bridge connection. While the amplifier 41 in FIG. 3 is asymmetric relatively to the direction of the current, in this case the amplifier 50 is symmetric. That means that both directions of the EMF induced in string 3 in the magnetic field are transmitted through leads 48, 49 and are proportionally amplified by amplifier 50. Behind amplifier 50 a limitator 51 is inserted, which prevents the amplitude of the exciting current from exceeding a given value of the EMF; in its absence, the mechanical amplitude of string 3 would become too big, which could cause a variation of frequency. Current $I_1$ also transmitted to nodes 42, 43 will change not only its value, but also its direction according to the vibration of the string.

Figure 5:
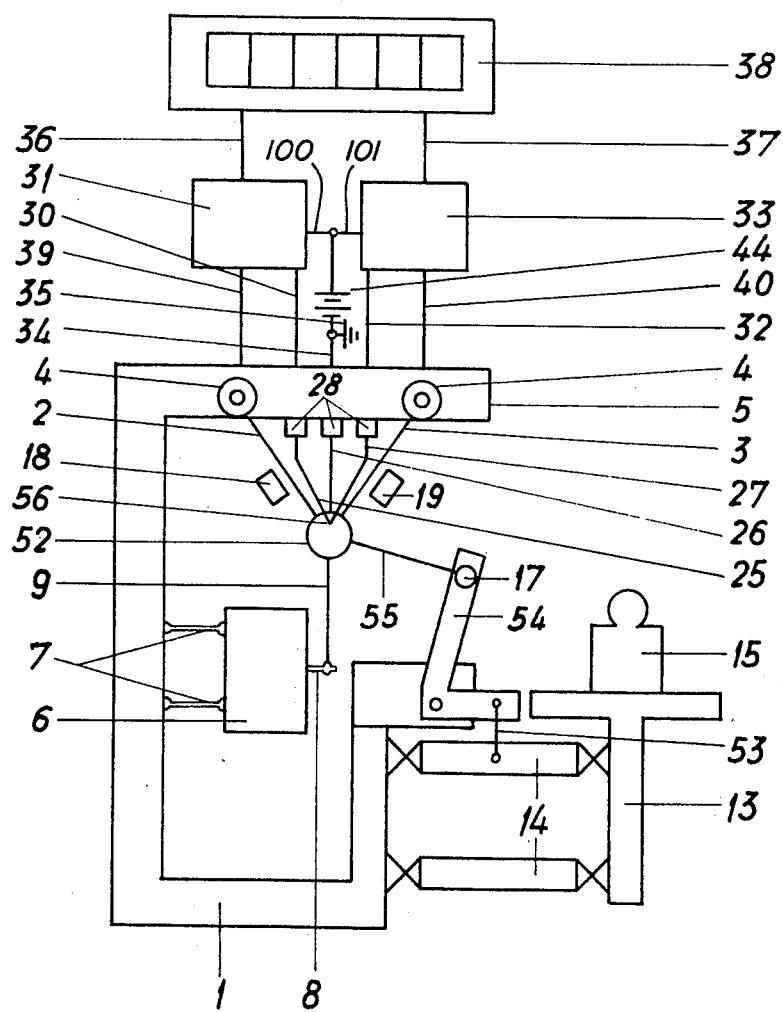
FIG. 5 is a second embodiment.

In FIG. 5 a further embodiment of the meter is represented. Instead of a beam-shaped body a cylinder 52 is used as a force distributor, whose axis is orthogonal to the plane of the two strings 2, 3. The force proportional to the weight of the mass 15 to be measured is transmitted to the force distributor 52 by means of a connecting rod 53, an L-shaped lever 54 rotatably mounted on frame 1, an insulating pin 17 and a second connecting rod 55. In this embodiment conductors 25, 26, 27 have a common fixation point 56 on the force distributor 52.

Figure 6:
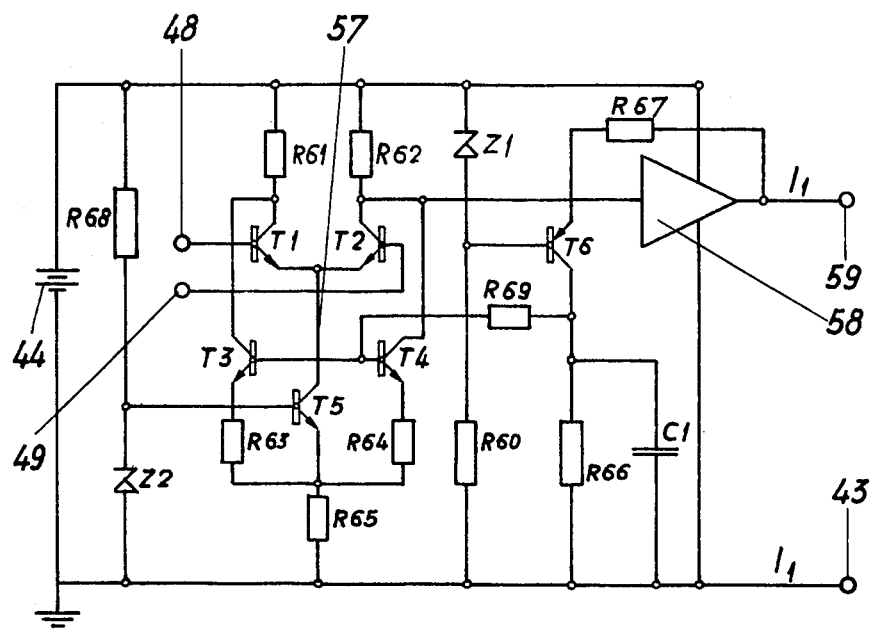
FIG. 6 is a wiring diagram of a first amplifier.

FIG. 6 represents the wiring diagram of the amplifier 41 according to FIG. 4. The potential difference between points 46, 47 is (as in FIG. 4) transmitted to amplifier 41 by the two leads 48, 49. As can be seen in FIG. 6 lead 48 is connected to the base of a transistor T 1 and lead 49 to the base of a transistor T 2. The collectors of the transistors T1, T2 are connected to the positive pole of battery 44 through resistances R61, R62. The emitters of transistors T1, T2 are electrically connected to each other and supplied through a connection 57, by the collector of a transistor T5, whose emitter is earthed through a resistance R65. Furthermore, the emitter of transistor T5 is connected, through resistances R63, R64 to the emitters of two other transistors T3, T4, whose collectors are electrically connected to the collectors of the transistors T1 and T2. The base current of transistors T3, T4 is supplied through a resistance R69, by the collector of another transistor T6, whose collector is earthed through a resistance R66. The base current of transistor T6 is supplied by battery 44 through a Zener diode Z1 inserted in reverse direction, which, to stabilize the working current, is earthed through a resistance R60. The base current of transistor T5 also passes through a Zener diode Z2 which, to stabilize the working current, is connected to the positive pole of battery 44 through a resistance R68. The emitter of transistor T6 is connected to the output of the schematically represented amplifier 58 through a resistance R67. A detailed description of this amplifier 58 is superfluous, because linear amplifiers are known and available as integrated circuits. The input of amplifier 58 is connected to the collector of the transistor T2. The current $I_1$ (as in FIG. 4) is supplied by an output 59 of amplifier 58. From node 43 current $I_1$ returns to amplifier 41.

When a voltage is applied through the connections 48, 49, it is, at the beginning, amplified with the whole amplification, because the voltage drop in the resistance R66 is zero. Therefore transistors T3, T4 are blocked. The amplified signal is received and amplified again by amplifier 58. As long as the initial voltage in amplifier 58 does not exceed the blocking voltage of the Zener diode Z1, the system works with a constant amplification factor. If the emitter voltage of transistor T6 becomes higher than the working voltage, it starts conducting, whereby a voltage drop develops in resistance R66 so that a capacitor C1 parallel to it is charged. This voltage drop being transmitted also to the bases of transistors T3, T4 through resistance R69, they start conducting, whereby the voltage drop in resistance R65 increases. This diminishes the amplification in the transistors T1, T2 because of the slightly higher emitter voltage. This leads to a reduction, depending on the voltage, of the whole amplification of the system. The current needed by the elements to be operative is indicated with $I_5$ in FIG. 4.

Figure 7:
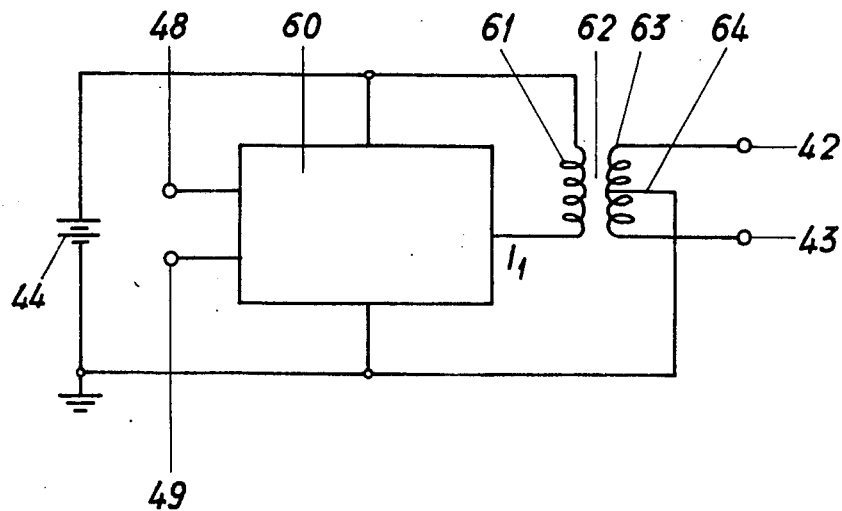
FIG. 7 is the wiring diagram of a second amplifier.

The representation of the wiring diagram of FIG. 7 is very schematic, because it differs from the circuit of FIG. 6 only by the output circuit. A circuit 60, schematically represented as a box, contains all the elements of FIG. 6 except battery 44. Current $I_1$ is not supplied directly to the bridge, but to the primary winding 61 of a transformer 62. The exciting current for the bridge is derived from the secondary winding 63 of the transformer earthed by a central tap 64, and transmitted to nodes 42, 43.

I claim:

1. A mass and force meter comprising a frame, a digital evaluation and display device, two pre-tensioned electrically conductive strings, each having one end thereof fixed electrically insulated to said frame, a force distributor, the other end of said strings being connected electrically to said force distributor, an exciter comprising electrical circuits for each string controlling an alternative current, two electric conductors, one in each of said circuits being electrically connected to said force distributor, a magnetic field extending over a part of the length of said strings, said alternative current exciting said strings to transversal vibrations, first and second transmission elements for transmitting to said strings a pre-tensioning force and a force proportional to the mass or force to be measured respectively, an electrically insulating element at each end of said transmission elements, said insulating elements being connected to said force distributor, which is thereby electrically insulated from said frame, the other ends of said transmission elements being operatively connected to receive their respective forces, means for applying to the evaluation and display device resultant frequency variations caused by the variations of tension of said strings due to the application of the force proportional to the mass or force to be measured.

2. A mass and force meter comprising a frame, a digital evaluation and display device, two pre-tensioned electrically conductive strings, each having one end thereof fixed electrically insulated to said frame, a force distributor, the other end of said strings being connected electrically to said force distributor, an exciter comprising electrical circuits for each string controlling an alternative current, two electric conductors, one in each of said circuits being electrically connected to said force distributor, each of said electric conductors closing one of said electrical circuits, a magnetic field extending over a part of the length of said strings, said alternative current exciting said strings to transversal vibrations, first and second transmission elements for transmitting to said strings a pre-tensioned force and a force proportional to the mass for force to be measured respectively, an electrically insulating element at each end of said transmission elements, said insulating elements being connected to said force distributor, which is thereby electrically insulated from said frame, the other ends of said transmission elements being operatively connected to receive their respective forces, means for applying to the evaluation and display device resultant frequency variations caused by the variations of tension of said strings due to the application of the force proportional to the mass or force to be measured.

3. A mass and force meter comprising a frame, a digital evaluation and display device, two pre-tensioned electrically conductive strings, each having one end thereof fixed electrically insulated to said frame, a force distributor, the other end of said strings being connected electrically to said force distributor, an exciter comprising electrical circuits for each string controlling an alternative current, three electric conductors in said circuits being electrically connected to said force distributor, one of said electric conductors closing said circuits of both said exciters, each of the other two of said three electrical conductors closing a respective circuit of each of said electrical circuits, a magnetic field extending over a part of the length of said strings, said alternative current exciting said strings to transversal vibrations, first and second transmission elements for transmitting to said strings a pre-tensioning force and a force proportional to the mass or force to be measured respectively, an electrically insulating element at each end of said transmission elements, said insulating elements being connected to said force distributor, which is thereby electrically insulated from said frame, the other ends of said transmission elements being operatively connected to receive their respective forces, means for applying to the evaluation and display device resultant frequency variations caused by the variations of tension of said strings due to the application of the force proportional to the mass or force to be measured.

* * * * *